United States Patent [19]
Vurens et al.

[11] Patent Number: 5,718,942
[45] Date of Patent: Feb. 17, 1998

[54] THIN FILM DISC LUBRICATION UTILIZING DISPARATE LUBRICANT SOLVENT

[75] Inventors: Gerard H. Vurens, Fremont; Hamid R. Samani, San Jose; Yassin Mehmandoust; Atef H. Eltoukhy, both of Saratoga, all of Calif.

[73] Assignee: StorMedia, Inc., Santa Clara, Calif.

[21] Appl. No.: 673,338

[22] Filed: Jun. 28, 1996

[51] Int. Cl.⁶ .................................................. B05D 5/12

[52] U.S. Cl. .................................. 427/127; 427/131
[58] Field of Search .......................... 427/131, 132, 427/129, 130, 598

Primary Examiner—Bernard Pianalto
Attorney, Agent, or Firm—Lahive & Cockfield, LLP

[57] ABSTRACT

A composite lubricant for thin-film magnetic discs comprising perfluoropolyether (PFPE) lubricant and an anti-oxidant, cyclophosphazene lubricant dispersed in a fluoropentane solvent.

4 Claims, 1 Drawing Sheet

THIN FILM DISC LUBRICATION UTILIZING DISPARATE LUBRICANT SOLVENT

This invention pertains to methods, and apparatus involving the utilization of a unique combination of a fluoropentane solvent and a special composite lubricant intended to enhance the lubricated properties of thin film magnetic disc media, especially of the type wherein the media is sputter deposited. The composite lubricant is preferably perfluoropolyether (PFPE) lubricant and cyclophosphazine lubricant.

The present invention is characterized by the utilization of a uniquely effective solvent, in the context of this invention, comprising a material identified as Vertrel XF, available from DuPont.

This material comprises, according to DuPont specifications, HFC 43-10 mee or 2,3-dihydrodecafluoropentane, the empirical formula of which is $C_5H_2F_{10}$. This material is a clear colorless liquid with properties as shown in the specification sheet materials attached to this Provisional Application (attached as Exhibit A).

Physical properties of Vertrel XF are as follows:

| Property | Vertrel ® XF |
| --- | --- |
| Molecular Weight g/Mol | 252 |
| Boiling Point, °C. | 54.0 |
| Freezing Point, °C. | −80.0 |
| At 25°C. | |
| Density, grams/cc | 1.58 |
| Viscosity, cp | 0.67 |
| Surface tension, dynes/cm | 14.1 |
| Specific heat, cal/gm °C. | 0.283 |
| Heat of vaporization, cal/gm | 31.5 |
| Vapor pressure, mm hg | 330 |
| Flammability | None |
| Solubility | |
| In Water, ppm | 140 |
| Of Water, ppm | 490 |

The present invention constitutes a particularly efficacious application of the above noted fluoropentane solvent to the composite lubricant comprising PFPE and a cyclophosphazine lubricant which has anti-oxidant properties.

This material overcomes problems attributable to the relatively, mutually immiscible properties of the PFPE and cyclophosphazine lubricants of the composite lubricant material and enables the composite lubricant to be effectively applied to discs.

This invention thus enables the significant advantages of a composite lubricant noted above to be achieved with the environmental and fabrication procedure advantages resulting from a materially reduced volume of solvent required to prepare the composite lubricant for application to discs and effect this application.

There is a distinctive property of the cyclophosphazine additive, that makes it so desirable as an additive to the perfluoropolyether lubricants and that is its capability of preventing the degradation of the perfluoropolyether by the head/disk interaction. This is due to its anti-oxidant properties. Data shows that the lubricant degradation due to the head/disk interaction is significantly reduced by this cyclophosphazine additive. This reduction in degradation gives a significant enhancement in the performance and durability of the disk.

While both the cyclophosphazine and the perfluoropolyethers have been separately disclosed as lubricants, the addition of the cyclosphosphazine to PFPE is more than just a mixture of the two compounds. The cyclophosphazine prevents the oxidative degradation of the perfluoropolyether. This is considered to be a non-obvious invention not suggested by the prior art of the art.

GENERAL STATE OF THE ART

PHYSICAL ASPECTS

Several prior patents disclose composite, magnetic media lubricants including multiple, physically distinct components, such being exemplified by:

| Patent Number | Patentee | Assignee | Subject Matter |
| --- | --- | --- | --- |
| 4,188,434 | Loran | Storage Technology Corporation | Stratified lubricants |
| 4,689,254 | Arndt et al | Verbatim Corporation | Dispersion of telomer of tetrafluoroethylene dispersed in a halogenated hydrocarbon, etc. with buffing and calendering being applied. |
| 4,786,544 | Saito | Hitachi Maxell, Ltd. | Liquid and solid lubricants with the liquid having an especial affinity for the media so that the solid lubricant forms surface projections. |
| 5,149,564 | Kato et al | Hitachi, Ltd. | PFPE emulsified with water and surfactant. |

While the references noted above contemplate physical admixtures involving lubricants, they do not anticipate or suggest the physical admixture of PFPE and a polyphosphazine material.

LUBRICANT MATERIAL

Prior art patents specifically disclosing the utilization of phosphazene materials as magnetic media lubricants include:

| Patent Number | Patentee | Assignee | Subject Matter |
| --- | --- | --- | --- |
| 4,613,548 | Lum | Ethyl Corporation | Liquid polyphosphazene lubricant mixtures. |
| 5,230,964 | Kar et al | The Dow Chemical Co. | Cyclic phosphazene substituted with fluorinated phenoxy substituents and m-perfluoroalkylphenoxy substituents. |

Two publications are also known to disclose the use of X-1P (the cyclophosphazine preferred in the practice of the present invention and commercially available from the Dow Chemical Company) as a magnetic disk lubricant material, i.e., a Yang et al paper entitled "Environmental Effects on Phosphazene Lubricated Thin-Film Disks" a Yang et al paper entitled "Cyclotdphosphazenes As New Lubricants For Rigid Magnetic Recording Media", both believed to have been published in 1994.

Of course, the use of fluorinated lubricant polymers such as PFPE as a media disk lubricant is conventionally acknowledged in the art as exemplified by the following disclosures:

| Patent Number | Patentee | Assignee |
|---|---|---|
| 3,778,308 | Roller et al | Ball Brothers Research Corp. |
| 3,862,860 | Pardee et al | Ball Brothers Research Corp. |
| 3,954,637 | Pardee et al | Ball Brothers Research Corp. |
| 5,055,359 | Tsuno et al | Nippon Sheet Glass Co., Ltd. |

A number of patents contemplate chemical modifications of phosphazene lubricants, these patent items including:

| Patent Number | Patentee | Assignee | Title |
|---|---|---|---|
| 4,526,833 | Burguette et al | Minnesota Mining and Manufacturing Co. | Magnetic Recording Medium Having A Perfluoropolyethe Polymer Protective Coating |
| 4,529,659 | Hoshino et al | Nippon Telegraph & Telephone Public Corp. | Magnetic Recording Medium And Process For Manufacturing The Same |
| 4,536,444 | Sumiya et al | Hitachi Maxell, Ltd. | Magnetic Recording Medium |
| 4,808,472 | Caporiccio et al | Montedison, S.p.A. | Fluoropolyethers Containing End Groups Endowed With Anchoring Capacity |

Supplementing patent disclosures of this nature are the following papers which disclose PFPE with phosphazine end groups:

1. Paciorek et al - Stability of perfluoroalkylethers. (1994)
2. Jones et al - Thermal Oxidative Degradation Reactions of Linear Perfluoroalkyl Ethers. (1983)
3. Jones et al - Improved Perfluoroalkyl Ether Fluid Development. (1987)
4. Jones et al - The Effects of Metals and Inhibitors on Thermal Oxidative Degradation Reactions of Unbranched Perfluoroalkyl Ethers. (1985)
5. Paciorek et al - Improved Perfluoroalkylether Fluid Development. (1987)

In this connection, it is to be noted that the physical admixture of X-1P and PFPE presently contemplated does not entail chemical interaction as contemplated by the prior art.

ITEMS OF COLLATERAL INTEREST

Prior art patents of general state-of-the-art interest include the following:

| Patent Number | Patentee | Assignee | Title |
|---|---|---|---|
| 3,490,946 | Wolff | RCA Corporation | Magnetic Recording Elements |
| 4,446,193 | Afzali-Ardakani et al | International Business Machines Corporation | Process For Chemically Bonding Lubricant To An Information Carrier And Products Thereof |
| 4,606,973 | Schmidt et al | The Dow Chemical Co. | Substrate With Perfluorocarbon Polymeric Coatings Having Low Critical Surface Tensions |
| 4,659,627 | Chung et al | Memorex Corporation | Magnetic Recording Medium With Lubricant |
| 4,664,978 | Wu et al | The Dow Chemical Co. | Methods Of Modifying Polymeric Surfaces And Articles Produced Thereby |
| 4,721,795 | Caporiccio et al | Montedison S.p.A. | Fluoropolyethers Containing End Groups Endowed With Anchoring Capacity |
| 5,113,302 | Shimizu et al | Nippon Sheet Glass Co., Ltd. | Magnetic Recording Medium Having A Coupling Agent Disposed Between A Protective Layer And A Lubricating Layer |
| 5,118,565 | Suzuki | Kao Corporation | Magnetic Recording Medium Having A Magnetic Layer Containing A Fatty Acid, A Fatty Acid Ester And A Single Specified Carbon Black |

RELATED APPLICATION

This present application discloses a composite lubricant concept for use with thin film magnetic discs, which concept is the subject of our concurrently filed U.S. patent application entitled "Enhanced, Thin Film Disc Lubrication", identifying the present co-inventors as co-inventors thereof, assigned to the Assignee of this present application, and embodying the disclosure of United States Provisional patent application Ser. No. 60/000,754 bearing this title and filed Jun. 30, 1995. The entire disclosure of this concurrently filed patent application and its predecessor provisional application are incorporated herein, by reference.

SUMMARY OF INVENTION

In a primary method aspect, the invention is directed to the following concept:

A method of reducing stiction in a thin film magnetic disc media system is contemplated in which a media disc is coated, at least in part, with Perfluoropolyether (PFPE) and in which this PFPE coating is engageable with a magnetic head. This method comprises:

A. providing PFPE material for a magnetic disc coating;

B. providing an anti-oxidant lubricant which is substantially non-reactive with the PFPE material, and relative more polar than the PFPE material;

C. physically admixing the PFPE material and the anti-oxidant lubricant with a fluoropentane solvent; and D. providing the physically admixed PFPE material and anti-oxidant lubricant and fluoropentane solvent on said magnetic disc to provide a magnetic disc lubricating coating comprising molecules of PFPE material and non-oxidant lubricant, interspersed in said fluoropentane solvent with the anti-with the anti-oxidant lubricant being relatively more polar than the PFPE material;

E. the physically admixed PFPE material and anti-oxidant lubricant on the magnetic disc being operable to reduce lubricant degradation and lubricant build-up under the magnetic head on the magnetic disc, and cause magnetic disc stiction properties to remain substantially constant and at a low level, independent of continuing disc usage and variations in magnetic disc temperature and humidity changes.

Independently significant apparatus aspects of the invention may be summarized as follows:

An apparatus for reducing stiction in a thin film magnetic disc media system is presented in which a media disc is coated, at least in part, with Perfluoropolyether (PFPE) and in which this PFPE coating is engageable with a magnetic head, this apparatus comprising:

A. means providing PFPE material for a magnetic disc coating;

B. means providing an anti-oxidant lubricant which is
substantially non-reactive with the PFPE material, and
relatively more polar than the PFPE material;

C. means for physically admixing the PFPE material and the anti-oxidant lubricant and fluoropentane solvent; and D. means providing the physically admixed PFPE material and anti-oxidant lubricant and fluoropentane solvent on the magnetic disc to provide a magnetic disc lubricating coating comprising
interspersed molecules of PFPE material and anti-oxidant lubricant, with the anti-oxidant lubricant being relatively more polar than the the PFPE material;

E. the physically admixed PFPE material and anti-oxidant lubricant on the magnetic disc being operable to
reduce lubricant degradation and lubricant build-up under the magnetic head on the magnetic disc, and
cause magnetic disc stiction properties to remain substantially constant and at a low level, independent of continuing disc usage and
variations in magnetic disc temperature and humidity changes.

With the invention thus summarized, it is now appropriate to consider presently preferred embodiments of the invention. As appropriate, reference will be made to appended drawings.

BRIEF DESCRIPTION OF THE DRAWINGS

In the drawings:

The FIGURE schematically depicts apparatus which may be employed in the practice of the method of this invention.

PRESENTLY PREFERRED EMBODIMENT

Figure 1:
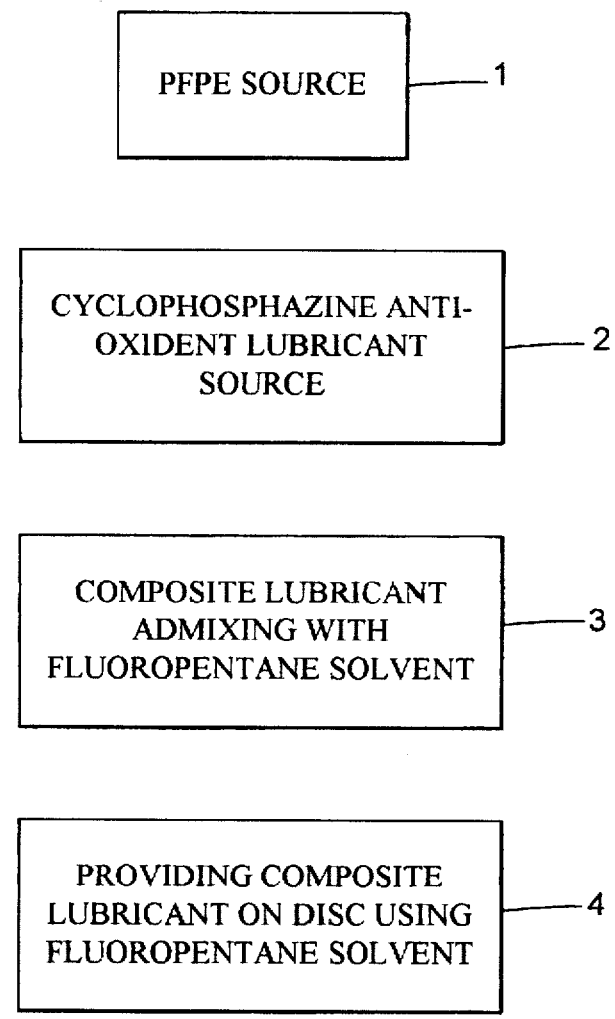

It is contemplated that the admixture of PFPE and X-1P constituents, above noted and the related quantity of composite lubricant solvent, i.e., a fluoropentane solvent such as the aforenoted Vertrel XF, may be physically combined or admixed, thereby effectively dispersing these lubricant constituents and avoiding misability considerations. Discs, including substrates having sputter deposited magnetic media layers and a protective overcoat (such as sputter deposited carbon), may be dipped in this enhanced lubricant formulation. Alternatively, the lubricant material may be applied as a composite directly to the disc overcoat surfaces, or in some cases, the PFPE and X-1P sequentially applied using the enhanced solvent of this invention, as generally noted in the above identified application filed concurrently herewith wherein the PFPE is applied via disc dipping and the X-1P tape-buffed onto these coated discs.

By way of example, it is contemplated that a liter of Vertrel XF solvent will effectively disperse about 3 cc of PFPE and about 1 cc of X-1P for disc application purposes. Relative amounts of these materials may vary substantially, depending upon operating requirements. This formulation example would be applicable to a disc dipping type of composite lubricant application.

Method Overview

In a primary method aspect, the invention is directed to the following concept:

A method of reducing stiction in a thin film magnetic disc media system is contemplated in which a media disc is coated, at least in part, with Perfluoropolyether (PFPE) and in which this PFPE coating is engageable with a magnetic head. This method comprises:
providing
PFPE material for a magnetic disc coating, and
an anti-oxidant lubricant which is
substantially non-reactive with the PFPE material, and
relatively more polar than the PFPE material, and
physically admixing the PFPE material and the anti-oxidant lubricant with a fluoropentane solvent.

The physically admixed PFPE material and anti-oxidant lubricant and fluoropentane solvent are provided on the magnetic disc by coating or dipping techniques so as to provide a magnetic disc lubricating coating comprising
molecules of PFPE material and non-oxidant lubricant, interspersed in the fluoropentane solvent with the anti-oxidant lubricant being relatively more polar than the PFPE material.

The physically admixed PFPE material and anti-oxidant lubricant on the magnetic disc are operable to
reduce lubricant degradation and lubricant build-up under the magnetic head on the magnetic disc, and
cause magnetic disc stiction properties to remain substantially constant and at a low level, independenet of continuing disc usage and
variations in magnetic disc temperature and humidity changes.

Apparatus Overview

An apparatus for reducing stiction in a thin film magnetic disc media system is presented in which a media disc is coated, at least in part, with Perfluoropolyether (PFPE) and in which this PFPE coating is engageable with a magnetic head. This apparatus, which may employ commercially available lubricant applying and mixing devices, comprises
source apparatus 1 providing PFPE material for a magnetic disc coating,
source apparatus 2 providing an anti-oxidant lubricant which is
substantially non-reactive with the PFPE material, and
relatively more polar than the PFPE material; and
mixing apparatus 3 for physically admixing the PFPE material and the anti-oxidant lubricant and fluoropentane solvent, and coating or dipping apparatus 4 which provides the physically admixed PFPE material and anti-oxidant lubricant and fluoropentane solvent on the magnetic disc to provide a magnetic disc lubricating coating comprising
interspersed molecules of PFPE material and anti-oxidant lubricant, with the anti-oxidant lubricant being relatively more polar than the PFPE material.

The physically admixed PFPE material and anti-oxidant lubricant on the magnetic disc are operable to
reduce lubricant degradation and lubricant build-up under the magnetic head on the magnetic disc, and
cause magnetic disc stiction properties to remain substantially constant and at a low level, independent of continuing disc usage and
variations in magnetic disc temperature and humidity changes.

SUMMARY OF NON-OBVIOUSNESS, ADVANTAGES AND SCOPE OF INVENTION

The present invention is characterized by a uniquely enhanced concept for effectively and economically providing the composite lubricant admixture of the present invention on the overcoat of thin film magnetic disc media.

The utilization of a fluoropentane solvent such as Vertrel XF permits admixing of the PFPE lubricant and the anti-oxidant, cyclosphosphazene lubricant X-1P to be accomplished with remarkable solvent efficiency and conservation, and overcome prior misability considerations.

This resulting economy and efficiency of the lubricant applying operation thus contributes to overall, lubricant applying effectiveness.

Certainly, the state of the prior art as noted at the outset of this disclosure fails to suggest this inventive concept and its consequential advantages. Such failings, in and of themselves, evidence the non-obviousness of the present invention to those skilled in the thin film, magnetic media disc art.

Those familiar with the present disclosure and skilled in this art may well recognize additions, deletions, substitutions or other modifications or equivalent arrangements which would be deemed to fall within the scope of the present invention, as set forth in the appended claims.

What is claimed:

1. A method of reducing stiction in a thin film magnetic disc media system in which a media disc is coated, at least in part, with Perfluoropolyether (PFPE) and in which this PFPE coating is engageable with a magnetic head, said method comprising:

A. providing PFPE material for a magnetic disc coating;
   B. providing a phosphazine anti-oxidant lubricant which is
      substantially non-reactive with said PFPE material, and relatively more polar than said PFPE material;
   C. physically admixing said PFPE material and said phosphazine anti-oxidant lubricant with a fluoropentane solvent; and
   D. providing said physically admixed PFPE material and phosphazine anti-oxidant lubricant and fluoropentane solvent on said magnetic disc to provide a magnetic disc lubricating coating comprising
      PFPE material and phosphazine anti-oxidant lubricant interspersed in said fluoropentane solvent, with
      said phosphazine anti-oxidant lubricant being relatively more polar than the said PFPE material;
   E. said physically admixed PFPE material and phosphazine anti-oxidant lubricant on said magnetic disc being operable to
      reduce lubricant degradation and lubricant build-up under said magnetic head on said magnetic disc, and
      cause magnetic disc stiction properties to remain substantially constant and at a low level, independent of continuing disc usage and
      variations in magnetic disc temperature and humidity changes.

2. The method of claim 1, wherein said fluoropentane solvent is 2,3-dihydrodecafluoropentane.

3. The method of claim 1, wherein said phosphazine anti-oxidant lubricant is a cyclophosphazine.

4. The method of claim 3, wherein said cyclophosphazene is X-1P.

* * * * *